United States Patent [19]

Ohmura et al.

[11] Patent Number: 5,402,208
[45] Date of Patent: Mar. 28, 1995

[54] IMAGE FORMING APPARATUS WHERE VIBRATIONS OF THE SCANNER DO NOT AFFECT THE WRITE OPERATION

[75] Inventors: Hiroshi Ohmura, Inagi; Masanori Sakai; Hideto Kohtani, both of Yokohama; Hirohiko Ito, Kawasaki; Takehito Utsunomiya, Yokohama, all of Japan

[73] Assignee: Canon Kabushiki Kaisha, Tokyo, Japan

[21] Appl. No.: 926,177

[22] Filed: Aug. 7, 1992

[30] Foreign Application Priority Data

Aug. 14, 1991 [JP] Japan .................. 3-204128

[51] Int. Cl.$^6$ ............................................ G03G 21/00
[52] U.S. Cl. ........................... 355/202; 355/233; 358/486; 358/497
[58] Field of Search ............... 358/409, 410, 474, 486, 358/494, 497; 355/233, 236, 202

[56] References Cited

U.S. PATENT DOCUMENTS

| 4,628,368 | 12/1986 | Kurata et al. | 358/497 |
| 4,748,514 | 5/1988 | Bell | 358/486 |
| 4,876,609 | 10/1989 | Ogura | 358/494 X |
| 4,884,104 | 11/1989 | Yoshida | 355/202 |
| 4,996,564 | 2/1991 | Shirasugi | 355/233 X |

Primary Examiner—A. T. Grimley
Assistant Examiner—Nestor R. Ramirez
Attorney, Agent, or Firm—Fitzpatrick, Cella, Harper & Scinto

[57] ABSTRACT

An image forming apparatus includes a reading unit for reading an original image, and a recording unit for recording an image. A control unit is also provided which controls the relative timing between the operations of the reading unit and the recording unit. The operation of the control unit enables the apparatus to perform a reading operation in a first mode, in which the reading unit reads an original image without the recording unit performing a recording operation, in parallel with a recording operation in a second mode, in which a different original image, read by the reading unit, is recorded by the recording unit, such that vibrations caused by either the reading operation in the first mode or the recording operation in the second mode do not affect the other operation. As a result of the structure of the apparatus, an advantageous feature can be attained in which the timing of a writing operation is controlled in accordance with the movement of the reading scanner.

21 Claims, 12 Drawing Sheets

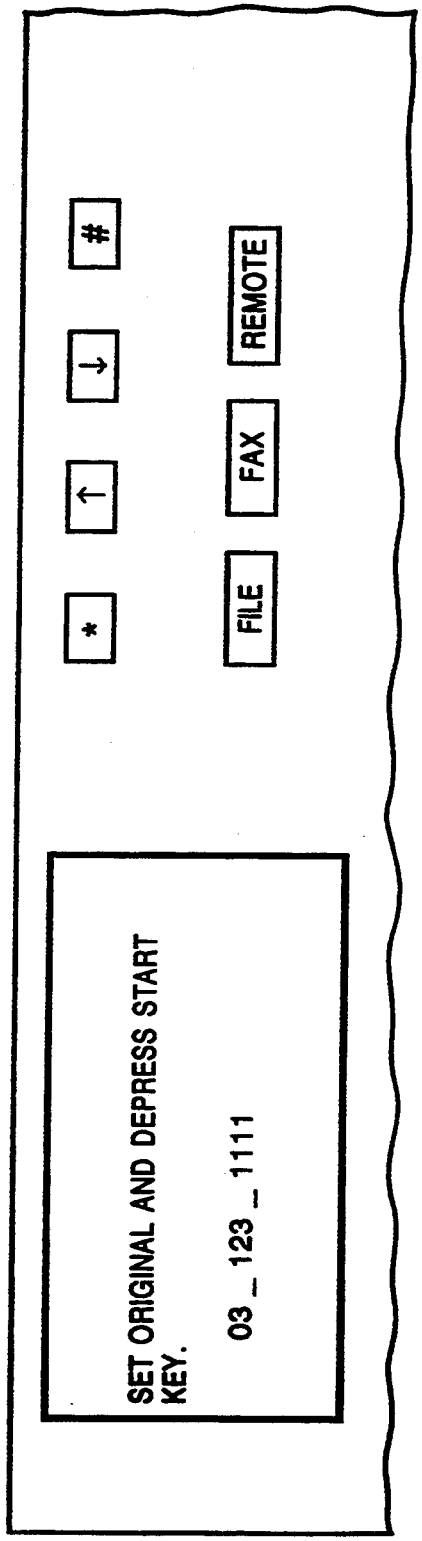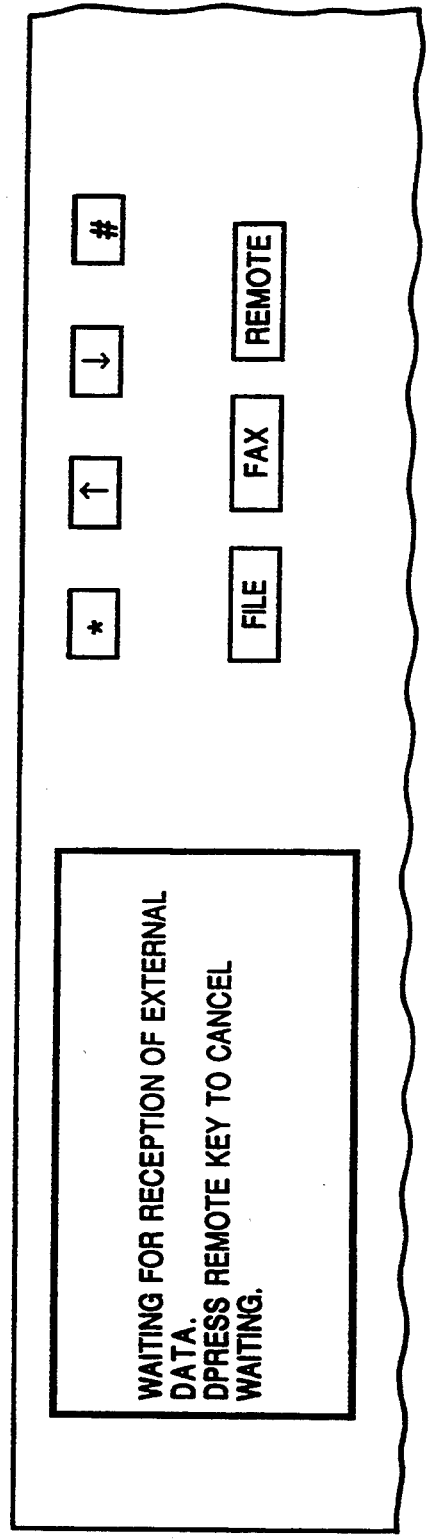
FIG. 7
FIG. 8

IMAGE FORMING APPARATUS WHERE VIBRATIONS OF THE SCANNER DO NOT AFFECT THE WRITE OPERATION

BACKGROUND OF THE INVENTION

The present invention relates to an image forming apparatus having a facsimile function and a function of printing out data from a computer or filing the data in a recordable medium.

In recent years, a copying machine having a facsimile function, a printer function of printing out an output from a computer, or a function of storing the data upon connection of a magnetic disk or the like thereto has been developed as a multifunctional copying machine. In a copying machine of this type, an original reading unit (to be referred to as a scanner unit hereinafter) and a printer unit are independently and asynchronously operated to independently effect the respective functions.

In the conventional multifunctional copying machine described above, in a print-out operation of data from a host computer during, e.g., facsimile transmission, since the scanner unit and the printer unit are independently and asynchronously operated, a vibration caused by reverse movement of the scanner unit to the home position upon reading of an original and a vibration caused by stop movement of the scanner unit adversely affect the printer unit. That is, part of a printed image is blurred, vibrated, or partially omitted by these vibrations.

The above problem is not limited to a combination of the printer and facsimile functions for outputting data from a computer. This problem is also posed by, e.g., a combination of a function of recording an original in a magnetic disk or the like and the facsimile function, and a combination of a function of storing an original in a recording medium and the printer function.

SUMMARY OF THE INVENTION

The present invention has been made in consideration of the conventional problems described above, and has as its object to provide an image forming apparatus which can prevent image degradation caused by vibrations caused by a combination of an image reading function and an image output function.

In order to achieve the above object of the present invention, there is provided an image forming apparatus including reading means for performing scanning in a predetermined direction to read an original image and output means for visually outputting input image data on a recording medium, the reading means and the output means being operated independently of each other, comprising monitor means for monitoring a predetermined original read time of the reading means and control means for controlling to cause the output means to perform an image data output operation in synchronism with a start of the original read time.

Preferably, the image data output operation by the output means is completed before or at the end of the predetermined original read time.

Preferably, the predetermined original read time is a time obtained by excluding rise and fall times of scanning by the reading means.

In order to achieve the above object of the present invention, there is also provided an image forming apparatus including reading means for performing scanning in a predetermined direction to read an original image and output means for visually outputting input image data on a recording medium, the reading means and the output means being operated independently of each other, comprising monitor means for monitoring a predetermined original read time of the reading means and control means for controlling to cause the output means to perform an image data output operation for a time except for the original read time.

The time except for the original read time is a time in which the reading means stops reading the original image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4, 5, 6, 7, and 8 are views showing display screen contents of an operation unit in the apparatus shown in FIG. 1;

DETAILED DESCRIPTION OF THE PREFERRED EMBODIMENT

A preferred embodiment of the present invention will be described with reference to the accompanying drawings.

<Description of Basic Operation>

[Normal Copying Operation]

Figure 1:
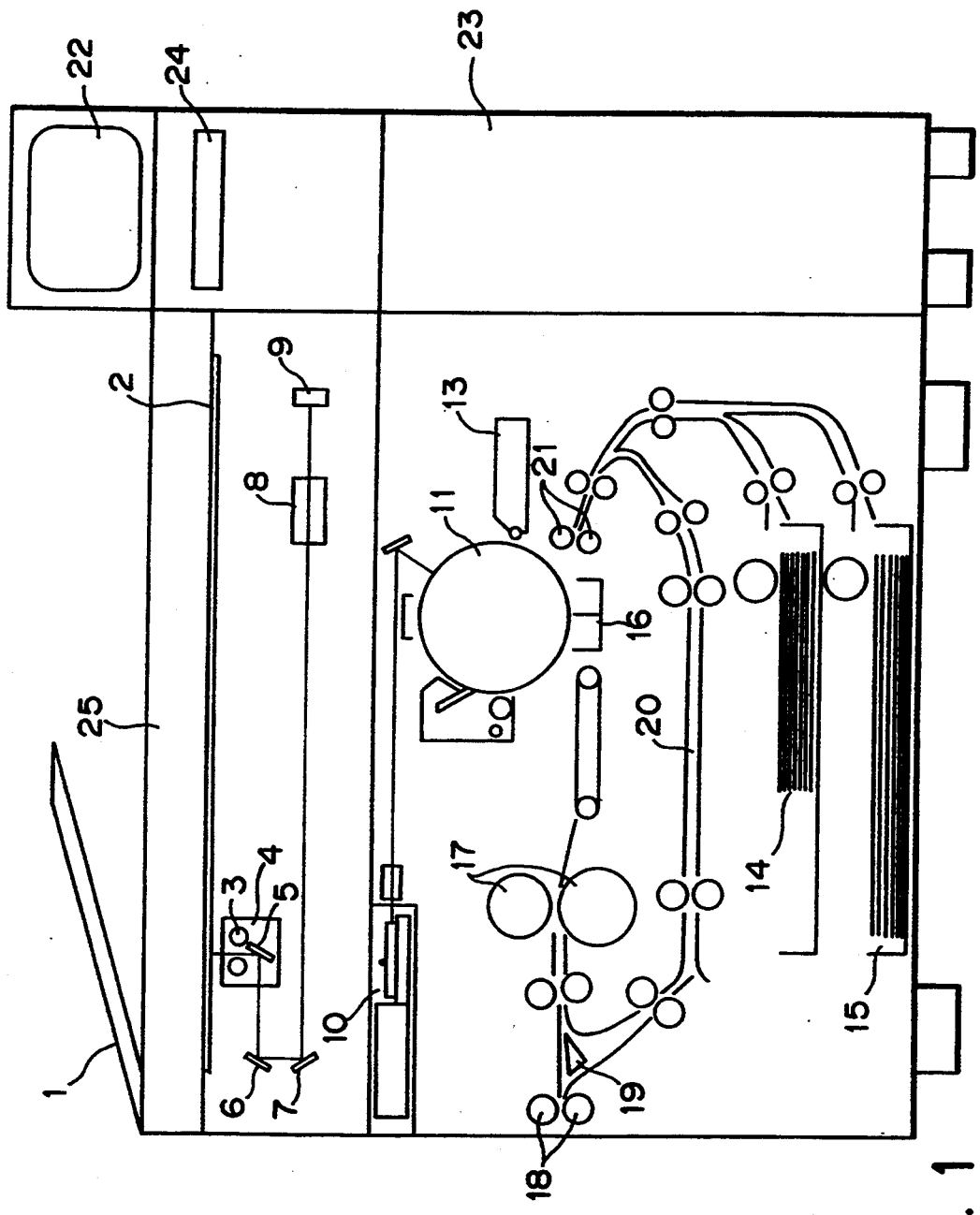
FIG. 1 is a sectional view showing an overall arrangement of an image forming apparatus according to an embodiment of the present invention.
Figure 2:
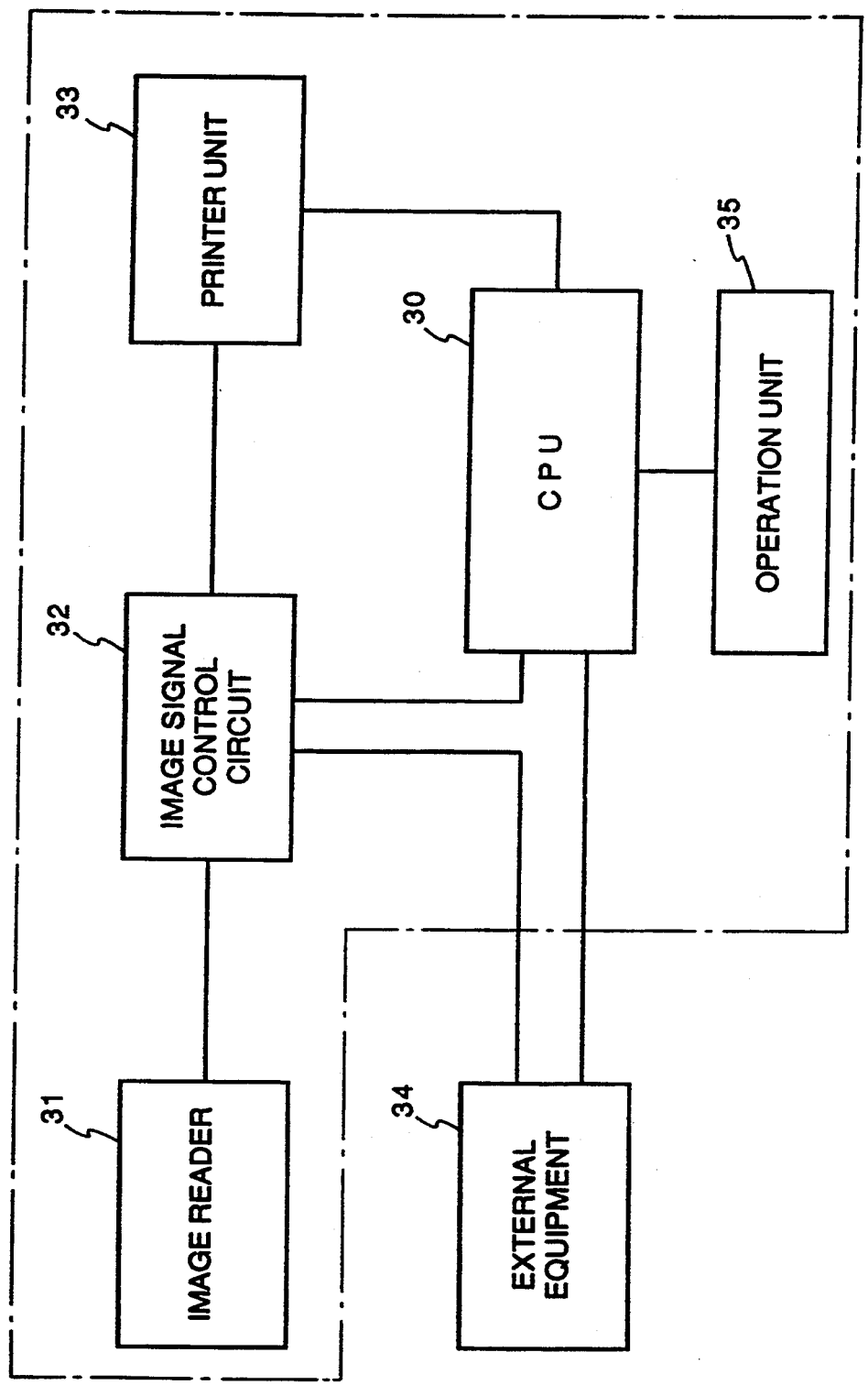
FIG. 2 is a schematic block diagram of the apparatus shown in FIG. 1.

FIG. 1 is a sectional view showing the overall arrangement of an image forming apparatus (to be referred to as an apparatus thereinafter) according to an embodiment of the present invention. FIG. 2 is a schematic block diagram of this image forming apparatus.

Referring to FIG. 1, originals placed on an original feeder 1 are fed one by one onto an original glass table 2. When each original is fed, a lamp 3 in a scanner unit is turned on, and at the same time a scanner unit 4 is moved to illuminate the overall surface of the original with light. Light reflected by the original passes through a lens 8 through mirrors 5, 6, and 7 and is input to an image sensor 9. An image signal input to the image sensor 9 corresponds to an input signal from an image reader 31 in the block diagram of FIG. 2. The input image signal is processed by an image signal control circuit 32 controlled by a CPU 30 in FIG. 2. The processed data is sent to a printer unit 33.

A signal input to the printer unit 33 in FIG. 2 is converted into an optical signal by an exposure controller 10 in FIG. 1, and a photosensitive body 11 is scanned in accordance with the content of the image signal. A latent image formed on the photosensitive drum 11 with this scanning is developed by a developing unit 13. A transfer sheet is fed from a transfer sheet stacker 14 or 15 in synchronism with formation of the latent image. The image developed by the developing unit 13 is transferred to the transfer sheet by a transfer unit 16. The transferred image is fixed on the transfer sheet by a fixing unit 17. The sheet is then discharged outside the apparatus from a discharge unit 18.

An external equipment 34 is connected to the apparatus, as shown in FIG. 2. A housing 23 in FIG. 1 corresponds to the external equipment 34. The external equipment includes a control circuit for a driver 24 as a detachable storage means (e.g., an optomagnetic disk), a facsimile communication function of using a communication line as another external equipment, or a printer interface function of outputting data from the printer unit 33 of the apparatus upon reception of an instruction from a computer. An external display unit 22 is used for reference, i.e., for retrieving a desired image from image data stored in the external equipment 34.

[Two-Sided Copying Operation]

An operation for printing out sequentially read images on the upper and lower surfaces of on a single output sheet will be described below.

In the two-sided output mode, after an output sheet fixed by the fixing unit 17 is fed to the discharge unit 18 to be turned over, it is fed to a refeed transfer sheet stacker 20 through a feed direction switching member 19. When the next original is prepared, an original image is read in the same manner as the above step. Since the transfer sheet is fed from the refeed transfer sheet stacker 20, two-page original images can be output on the upper and lower surfaces of the single output sheet.

[Reduction Copying Operation]

An operation for reducing the size of an original image and outputting a reduced image on a transfer sheet will be described below. In this embodiment, the image signal read rate of the image reader 31 is set constant.

When the moving speed of the scanner unit 4 for illuminating an original is increased, the amount of image information input to the image reader 31 within a unit time can be increased. The size of the image represented by the image signal can therefore be reduced in the sheet feed direction (subscanning direction). The size of the image in the vertical direction (main scanning direction) can be adjusted by controlling the image signal inputs/outputs through the image signal control circuit 32 in FIG. 2.

Figure 3:
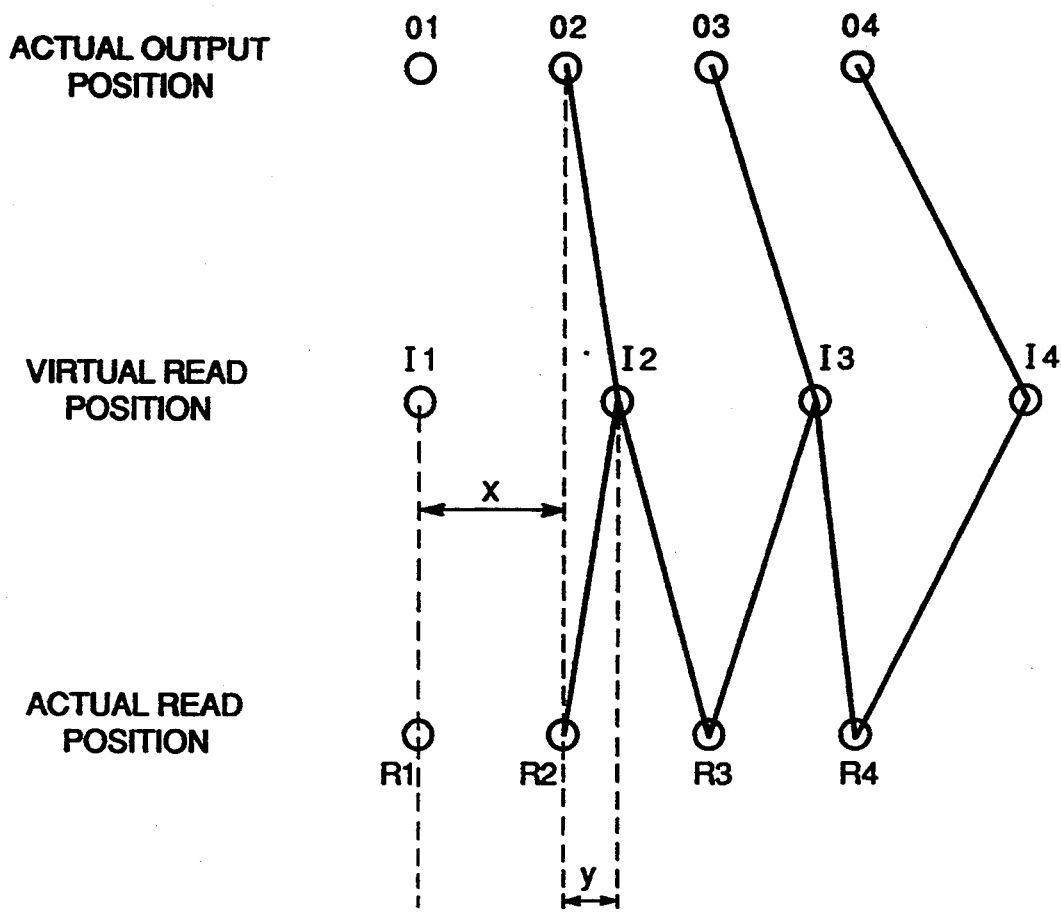
FIG. 3 is a view for explaining reduction of an original image.

Image reduction of x/(x+y) % will be described with reference to FIG. 3. In a one-to-one size copy mode, an actual output position in FIG. 3 corresponds to an actual read position. In a reduction mode, an image signal is regarded to be input at a virtual read position. When image data at this virtual position is output to an actual output position, the resultant image is reduced. An image density at the virtual read position is interpolated and predicted by the following equation using density values of an image signal input at the actual read position:

$$O2 = \{R3 \cdot y + R2 \cdot (x-y)\}/x \tag{1}$$

[Description of Operations for External Equipment]

Operations for the external equipment 34 in the image forming apparatus of the present invention will be described below.

Figure 4:
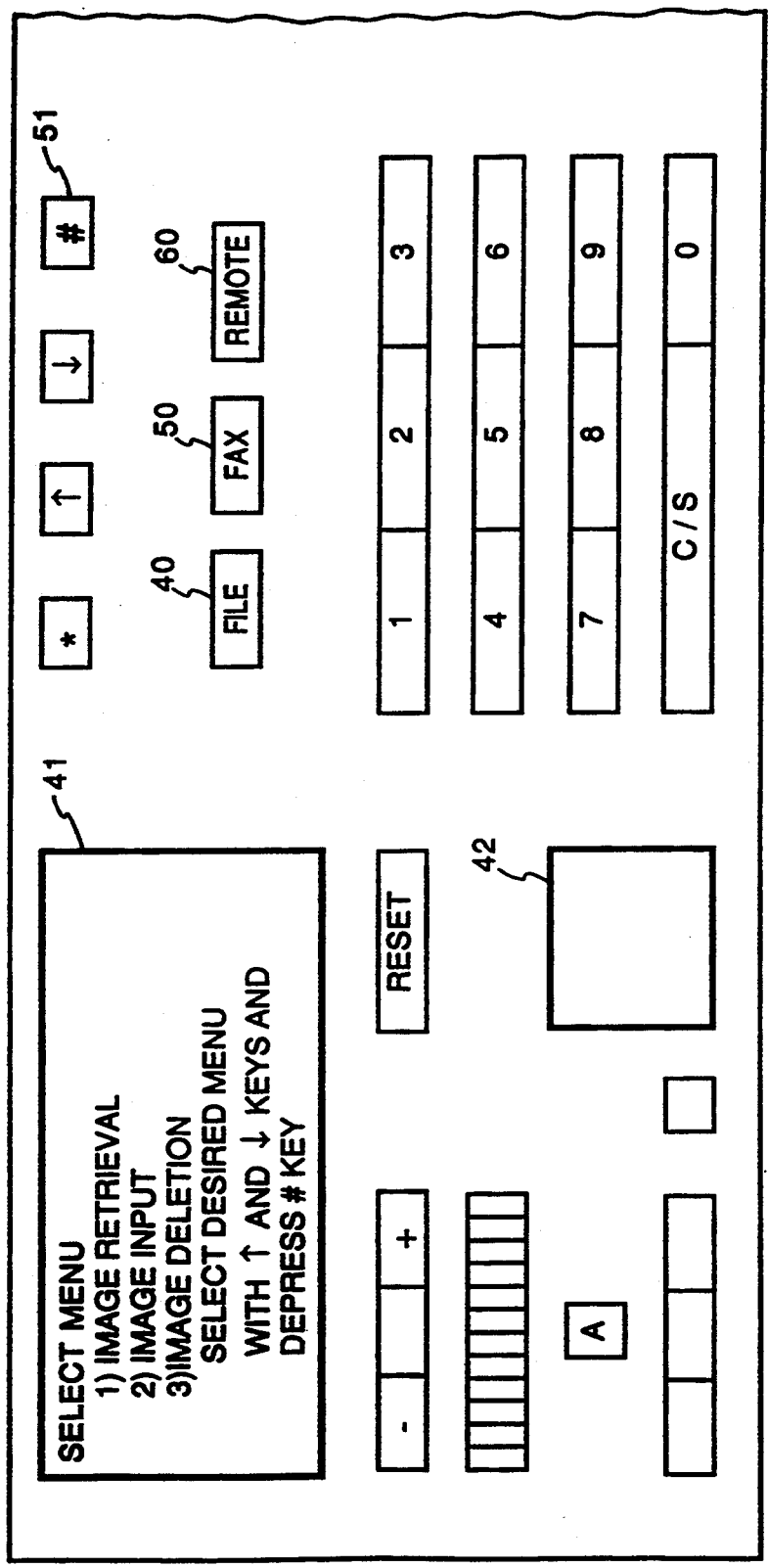

FIG. 4 shows display contents of an operation unit 25 of the apparatus. When a user depresses a file key 40 (FIG. 4) to designate an operation for the detachable storage means, the screen shown in FIG. 4 is displayed on a display unit 41. Desired processing is selected from "image retrieval", "image input", or "image deletion" in accordance with a screen prompt.

Figure 5:
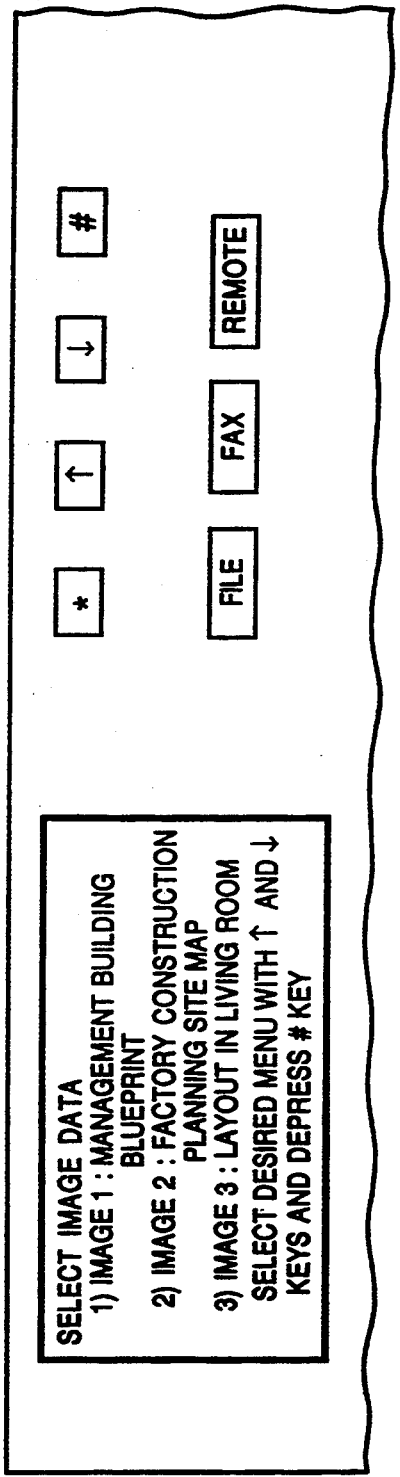

For example, when the image retrieval is selected, a pull-down menu shown in FIG. 5 is displayed. In the retrieval mode, a keyword assigned to each image data in advance is also displayed to support a choice of the user. When the user selects a desired image from an image data list, the selected image data is displayed on the display unit 22. After the image displayed by the user is confirmed as the desired data, the user depresses a copy start key 42 to output image data from the printer unit 33.

An operation for a facsimile communication function included in the external equipment will be described below.

Figure 6:
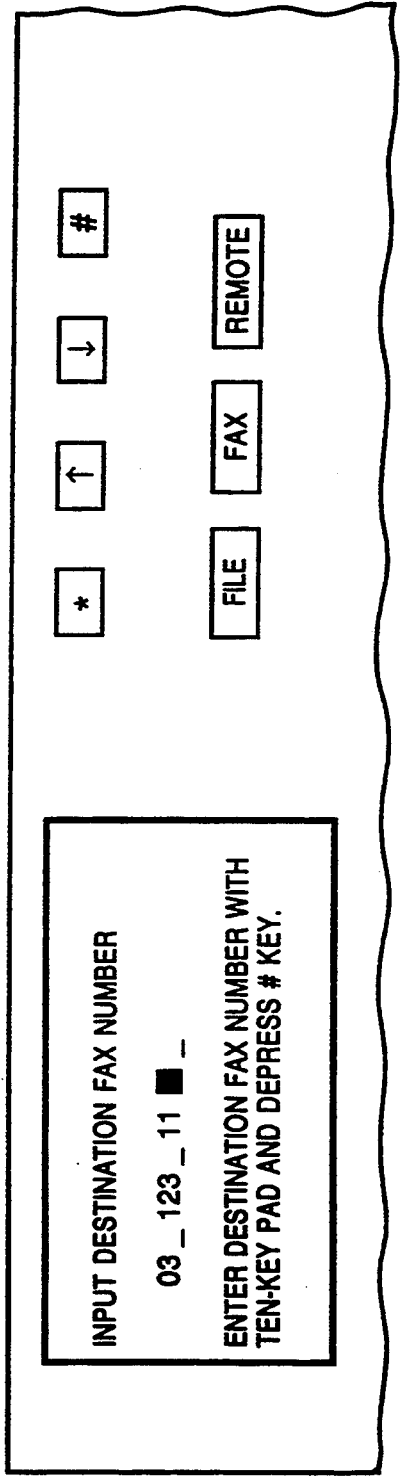

In order to use the facsimile communication function, a fax key 50 in FIG. 4 is depressed. A screen shown in FIG. 6 is obtained upon depression of the fax key 50. More specifically, this screen indicates that the apparatus waits for an input of a destination facsimile number upon the above key input. The user enters the facsimile number with a ten-key pad (not shown) in accordance with a screen prompt. After the facsimile number is entered, the user depresses a "#" key 51 to confirm the input, and the screen in FIG. 6 on the display unit 41 transits to a screen shown in FIG. 7.

When the user places a desired transmission original on the original glass table 2 of the apparatus and depresses the copy start key 42 also serving as a start key, a facsimile control circuit (not shown) arranged in the housing 23 starts communication.

An operation for outputting data transmitted from a computer is performed as follows.

In this case, the user depresses a remote key 60 to set a wait mode for receiving external data. In this state, a screen display on the display unit is obtained as shown in FIG. 8. When output data is transmitted from the computer (to be described later in detail), the transmission data is sent to an LBP circuit 1007 through an external interface 1011 and a CPU 1010 (FIG. 9) of the external equipment 34 and is processed in the apparatus.

<Description of External Equipment>

Figure 9:
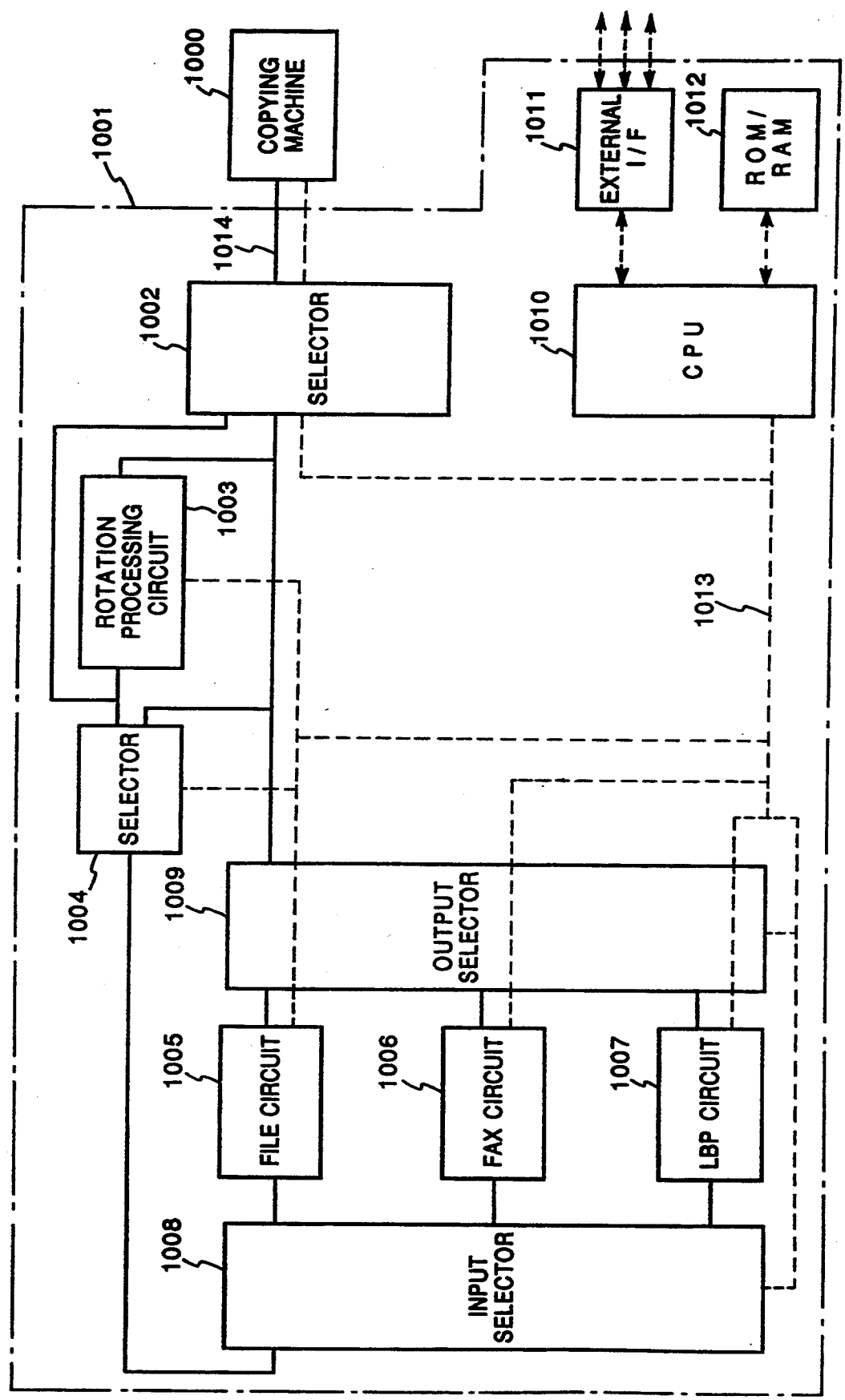
FIG. 9 is a detailed block diagram of an external equipment according to the embodiment shown in FIG. 1.

FIG. 9 is a detailed block diagram of the external equipment corresponding to the housing 23 in FIG. 1. Referring to FIG. 9, a copying machine 1000 is connected to an external equipment 1001, and a selector 1002 in the external equipment 1001 selects a reception mode for receiving image data from the copying machine 1000 to the external equipment 1001 or a transmission mode for transmitting image data from the external equipment 1001 to the copying machine 1000. A rotation processing circuit 1003 rotates image data to be transmitted to the copying machine 1000 or image data received from the copying machine 1000. A selector 1004 selects one of the data from the rotation processing circuit 1003, image data without being through the rotation processing circuit 1003, or an image data output inhibition mode.

An input selector 1008 selects to output image data from the selector 1004 to a FILE circuit 1005, a FAX circuit 1006, or the LBP circuit 1007, or to a plurality of these circuits. The FILE circuit 1005 files the image data from the input selector 1008 and outputs the filed image data to an output selector 1009. The FILE circuit 1005 includes the driver 24 serving as a storage means and the external display unit 22, both of which are shown in FIG. 1. The FAX circuit 1006 performs facsimile transmission of image data from the input selector 1008 and outputs the received facsimile image to the output selector 1009. The LBP circuit 1007 develops image data from the input selector 1008 in a print memory in the LBP circuit 1007 and outputs the image data developed by, e.g., page description language to the output selector 1009.

The output selector 1009 outputs the image data from the FILE circuit 1005, the image data from the FAX circuit 1006, or the image data from the LBP circuit 1007 to one of the selector 1004, the rotation processing circuit 1003, and the selector 1002. The CPU 1010 communicates with the copying machine 1000, the FILE circuit 1005, the FAX circuit 1006, and the LBP circuit 1007 and controls image data exchange between the selector 1002, the selector 1004, the input selector 1008, the output selector 1004, the input selector 1008, and the output selector 1009. The CPU 1010 also communicates with an external equipment (not shown) through the external interface circuit 1011 to control the overall operation of the external equipment 1001. A control program for the CPU 1010 is stored in a ROM/RAM 1012. The ROM/RAM 1012 also serves as a memory functioned as a work memory. A signal line 1013 is a communication line serving as a CPU bus, and a signal line 1014 serves as an image data line.

[Operation of External Equipment]

An operation of the external equipment shown in FIG. 9 will be described below.

First, original filing will be described.

In order to file an original, the user depresses the file key 40 on the copying machine 1000 to set various conditions and places a desired original on the original table. When the user depresses the copy start key, the various setting conditions are transmitted from the copying machine 1000 to the CPU 1010 through the selector 1002 via the communication line 1013 serving as the communication line. These set data are transmitted from the CPU 1010 to the FILE circuit 1005 through the communication line 1013. The FILE circuit 1005 performs setting operations represented by the set data and informs the end of preparation to the CPU 1010.

Upon reception of the information representing the end of preparation, the CPU 1010 controls the selector 1002 to send the image data from the copying machine 1000 to the rotation processing circuit 1003. In addition, the CPU 1010 controls the selector 1004 and the input selector 1008 to send the image data from the rotation processing circuit 1003 to the FILE circuit 1005 through the selector 1004 and the input selector 1008.

The CPU 1010 informs the end of image read preparation to the copying machine 1000. Upon reception of information representing the end of image read preparation, the copying machine 1000 turns on the lamp 3 of the scanner unit, and at the same time moves the scanner unit 4 to illuminate the original, as previously described. That is, the input signal from the image reader 31 shown in FIG. 2 has been processed by the CPU 30. The processed signal is input to the selector 1002 through the image data line 1014 and is input to the FILE circuit 1005 in accordance with the above-mentioned image data flow. At this time, if overall rotation of the image data is required, the image data is rotated by the rotation processing circuit 1003. Otherwise, no processing is performed in the rotation processing circuit 1003, and the image data is directly output.

The FILE circuit 1005 converts the image data into a structure corresponding to the format of the disk and records the converted data. When the read operation of the FILE circuit 1005 is completed, the FILE circuit 1005 informs the end of read operation to the CPU 1010. Upon reception of this information, the CPU 1010 causes the selector 1002 to disconnect the copying machine 1000 from the image data line 1014. The CPU 1010 transmits information representing the end of read operation to the copying machine 1000, so that the copying machine 1000 restores the initial state.

When an original is to be sent by a facsimile, image data is input to not only the FILE circuit 1005 but also the FAX circuit 1006. Other operations are the same as those in the filing mode, and a detailed description thereof will be omitted.

An operation for printing out a filed original will be described below.

In this case, the user depresses the file key 40 and sets various print conditions. When the user depresses the copy start key, the various set are sent from the copying machine 1000 to the CPU 1010 through the selector 1002 via the communication line 1013. These set data are sent from the CPU 1010 to the FILE circuit 1005 via the communication line 1013. The FILE circuit 1005 performs setting operations represented by these set data and informs the end of preparation to the CPU 1010.

Upon reception of the information representing the end of preparation, the CPU 1010 controls the output selector 1009 to send the image data from the FILE circuit 1005 to the rotation processing circuit 1003. The CPU 1010 controls a disconnection operation of the selector 1004 and the selector 1002 so that the image data is sent from the rotation processing circuit 1003 to the copying machine 1000 through the selector 1002. A route for a series of image data has thus been determined.

The CPU 1010 then informs the end of image output preparation to the copying machine 1000. Upon reception of the information representing the end of image output preparation, the copying machine 1000 starts a print-output operation. More specifically, the image data is input to the image signal control circuit 32 in FIG. 2, and the signal input to the printer unit 33 is printed out by the above-mentioned operation. At this time, if rotation of the image data is required, the data is rotated by the rotation processing circuit 1003. Otherwise, no processing is performed in the rotation processing circuit 1003, and the image data is directly output.

Upon completion of the print-out operation, the copying machine 1000 informs the end of printing to the CPU 1010. Upon reception of the information representing the end of printing, the CPU 1010 controls the selector 1002 to disconnect the copying machine 1000 from the image data line 1014. When the CPU 1010 informs the end of printing to the FILE circuit 1005, the FILE circuit 1005 restores the initial state.

Even if image data sent by a facsimile is to be printed out or data sent from a computer is to be printed out, the image data are output from the FAX and LBP circuits 1006 and 1007 but not from the FILE circuit 1005. Other operations are the same as those in the output from the FILE circuit 1005.

An operation of sending a filed original by a facsimile will be described below.

The user depresses the file key 40 and the fax key 50 and sets various file and facsimile conditions. When the user depresses the copy start key, the various set data are sent from the copying machine 1000 to the CPU 1010 through the selector 1002 via the communication line 1013. These set data are sent from the CPU 1010 to the FILE circuit 1005 and the FAX circuit 1006 via the communication line 1013 in the same manner as described above. The FILE circuit 1005 and the FAX circuit 1006 set various conditions represented by these set data and inform the ends of preparation to the CPU 1010. Upon reception of these pieces of information representing the ends of preparation, the CPU 1010 controls the output selector 1009 to send the image data from the FILE circuit 1005 to the rotation processing circuit 1003. In addition, the CPU 1010 controls the selector 1004 and the input selector 1008 to send the image data from the rotation processing circuit 1003 to the FAX circuit 1006 through the selector 1004. A route for a series of image data has thus been determined.

The CPU 1010 informs the end of image output preparation to the FILE circuit 1005. Upon reception of this information representing the end of image output preparation, the FILE circuit 1005 starts transmitting the image data. If rotation of the image data is required, the data is rotated by the rotation processing circuit 1003. Otherwise, no processing is performed in the rotation processing circuit 1003, and the image data is directly output. When transmission is completed, the FILE circuit 1005 informs an end of transmission to the CPU 1010. Upon reception of the information representing the end of transmission, the CPU 1010 disconnects the output selector 1009 from the image data line 1014 and informs an end of transmission to the FAX circuit 1006. As a result, the FAX circuit restores the initial state.

When image data sent by a facsimile is to be filed or when data sent from a computer is to be filed, only the image data flow is different from that described above, and a detailed description thereof will be omitted.

<Description of Vibration Preventive Operation>

An operation for preventing adverse influences of vibrations caused by interaction between the scanner and printer units which are independently operated by the above functions in the apparatus of this embodiment will be described below.

This vibration preventive control is executed in a controller 2000 in the image signal control circuit 32 shown in FIG. 2. A synchronous control method as in the operations in the copying machine will be exemplified although the scanner and printer units perform different jobs.

Figure 10:
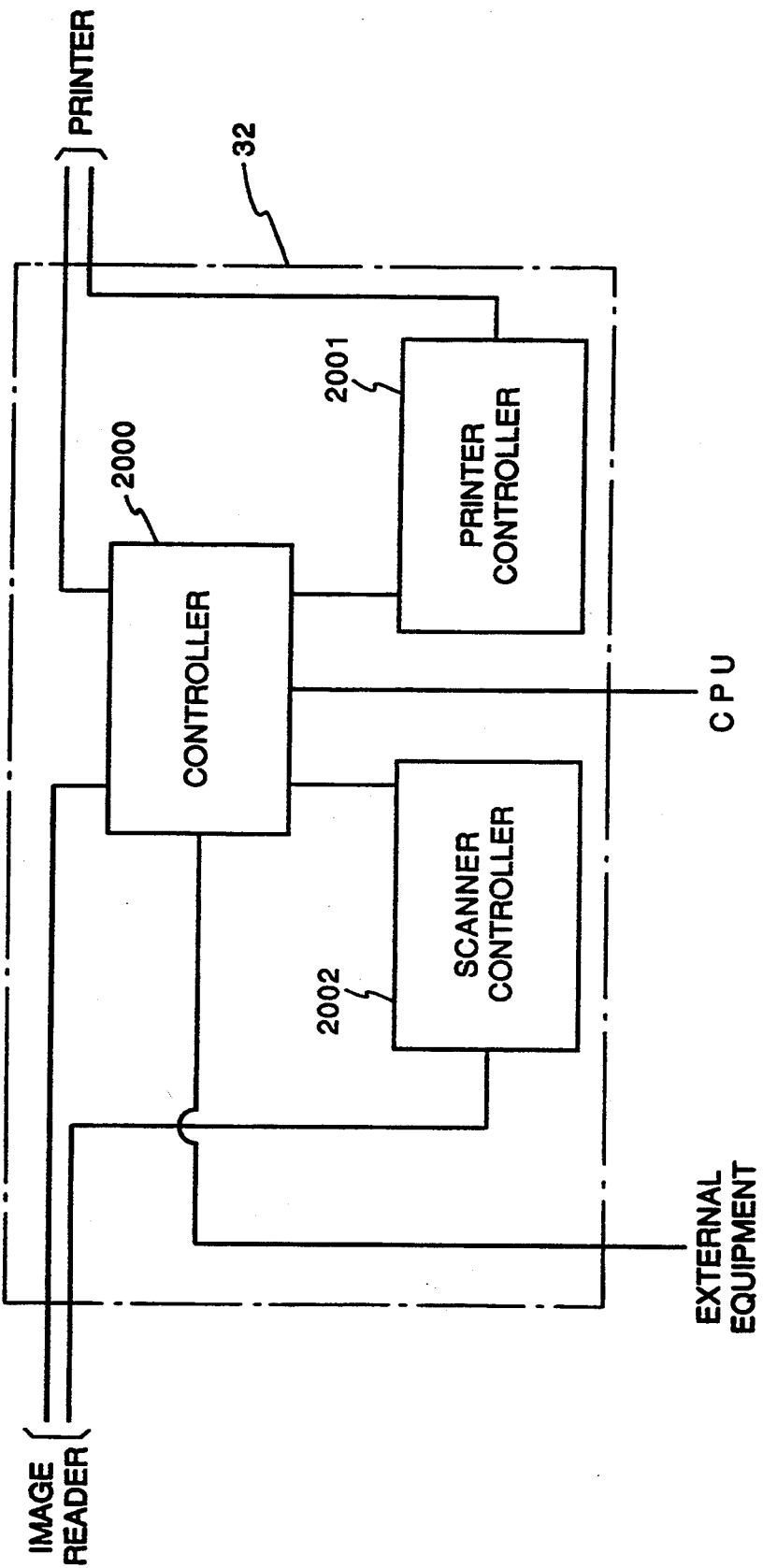
FIG. 10 is a block diagram showing an internal arrangement of an image signal control circuit of the embodiment shown in FIG. 1.
Figure 11:
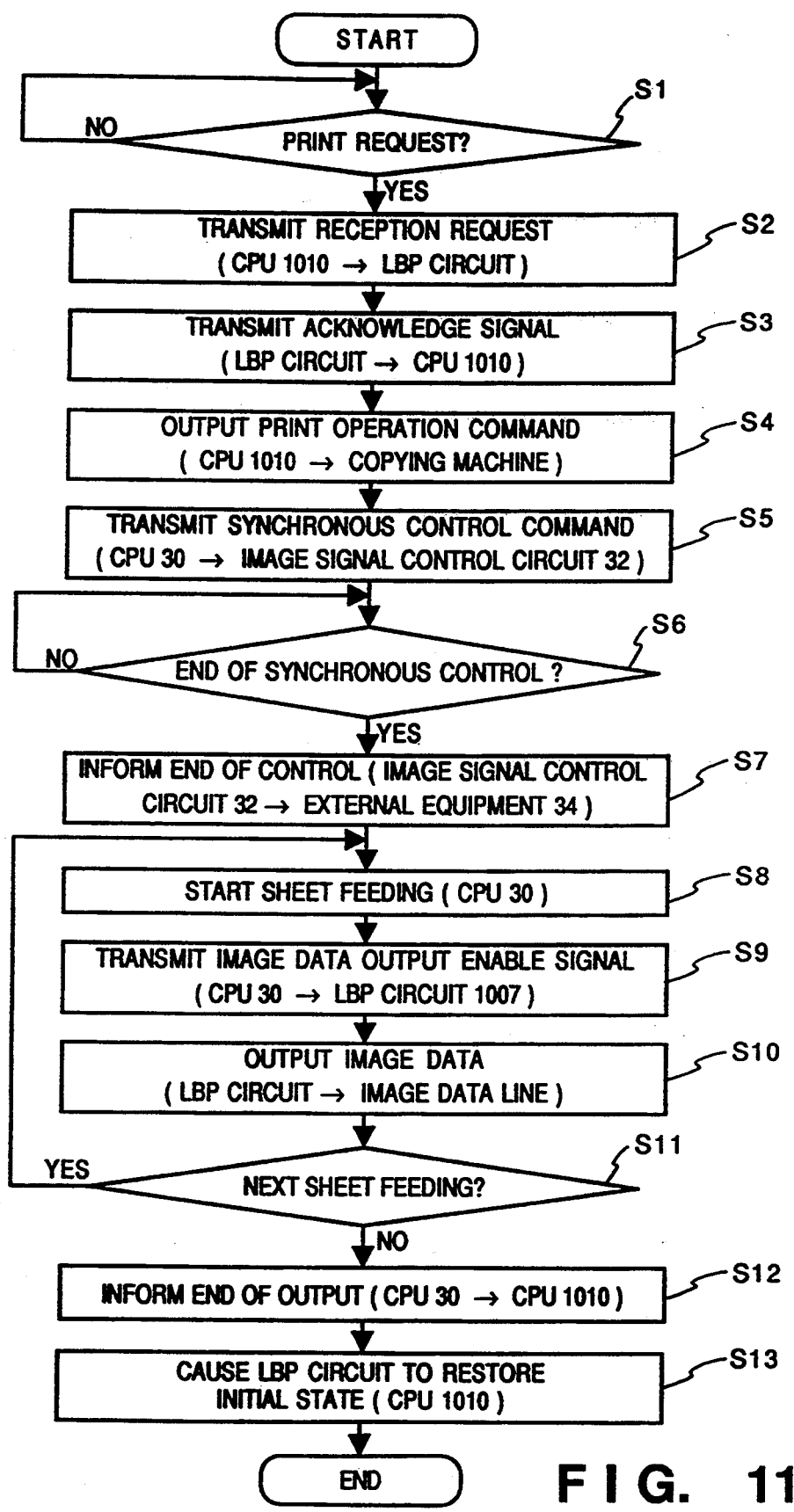
FIG. 11 is a flow chart showing an operation sequence when a printer operation from a computer is to be performed during facsimile transmission.

FIG. 10 is a block diagram showing the internal arrangement of the image signal control circuit 32. As shown in FIG. 10, the controller 2000 controls a printer controller 2001 and a scanner controller 2002. An operation sequence for an operation for printing data from the computer during facsimile transmission will be described with reference to a flow chart in FIG. 11.

As described above, image data transmission from the copying machine 1000 to the FAX circuit 1006 is performed through the image data line 1014. More specifically, an image signal from the image sensor 9, i.e., an input signal from the image reader shown in FIG. 2 is processed by the image signal control circuit 32 controlled by the CPU 30 during image reading, and the processed data is sent to the external equipment 34. At this time, if a print-out request is sent (i.e., YES in step S1) from a computer (not shown) to the CPU 1010 through the external interface circuit 1011, the CPU 1010 outputs a reception request to the LBP circuit 1007 (step S2). When an acknowledge signal is sent back from the LBP circuit 1007 to the CPU 1010 through the communication line 1013 (step S3), the CPU 1010 outputs a print operation command to the copying machine 1000 through the communication line 1013 (step S4).

Upon reception of the print operation command, the copying machine 1000, i.e., the CPU 30 in FIG. 2 outputs a control command to the image signal control circuit 32 so as to output image data currently read by the scanner unit to the external equipment 34 and at the same time print out the image data from the external equipment 34 (step S5). Upon reception of this control command, the image signal control circuit 32 assures a processing system which can perform processing represented by the control command. When this control (synchronous control) is completed (YES in step S6), the image signal control circuit 32 informs the end of control to the external equipment 34 through the CPU 30 (step S7).

As described above, the external equipment 34 causes the copying machine 1000 to output data to the FAX circuit 1006 and at the same time causes the LBP circuit 1007 to output data to the copying machine 1000. That is, the image data from the external equipment 34 is processed by the image signal control circuit 32, and the processed data is input to the printer unit 33. The signal input to the printer unit 33 is converted into an optical signal by the exposure controller 10, and the photosensitive body 11 is scanned with light in accordance with the image signal. A latent image formed on the photosensitive body with radiation light is developed by the developing unit 13. In synchronism with formation of the latent image, a transfer sheet is fed from the transfer sheet stacker 14 or 15 (step S8). The developed image is transferred in the transfer unit 16. The transferred image is fixed on the transfer sheet by the fixing unit 17. The transfer sheet is then discharged outside the apparatus by the discharge unit 18.

Figure 12:
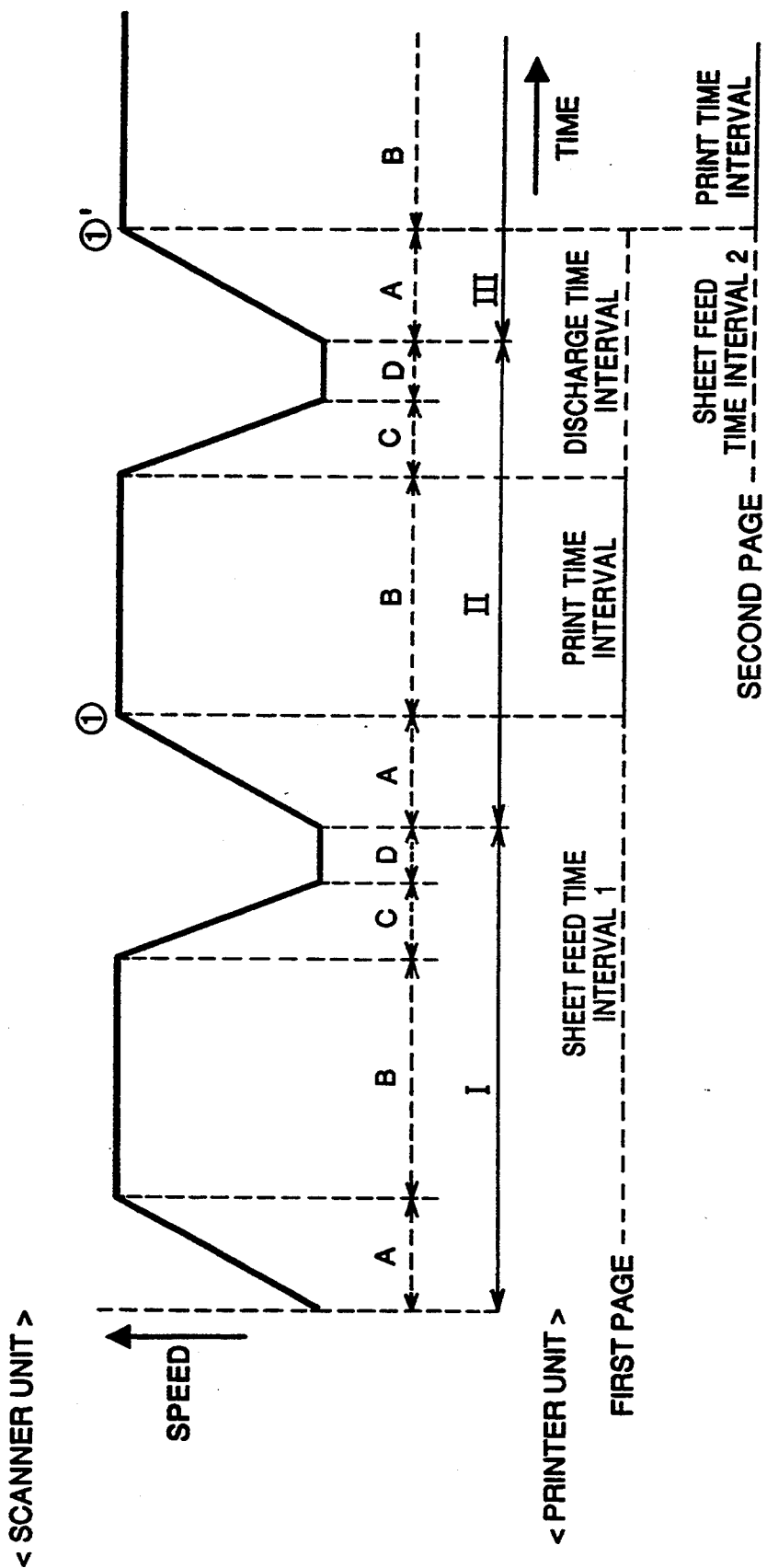
FIG. 12 is a timing chart obtained when scanner and printer units of the embodiment shown in FIG. 1 are to perform image data reading and image data output, respectively.

FIG. 12 shows timings to read image data from the scanner unit and output the image data from the printer unit. The LBP circuit 1007 receives an output enable signal of the image from the CPU 30 at a timing ① of the timing signal shown in FIG. 12 (step S9) and sends the image data onto the image data line 1014 (step S10). At this time, the image data from the scanner unit is transmitted onto the image data line 1014, but on a signal line different from that of the image data from the scanner unit, thereby preventing collision of the signals.

The CPU 30 determines the presence/absence of the next sheet feeding (step S11). If the next sheet is to be fed, sheet feeding is performed (YES in step S11, and the processing returns to step S8). If the next sheet feeding is not required, the CPU 30 informs the end of output to the CPU 1010 (step S12). As a result, the LBP circuit 1007 restores the initial state under the control of the CPU 1010 (step S13), thus ending the processing.

In the timing chart shown in FIG. 12, a time interval A is a rise time interval of the scanner unit, a time interval B is a constant speed time interval of the scanner unit, a time interval C is a fall time interval of the scanner unit, and a time interval D is an idle time interval of the scanner unit. Image data is read from the scanner unit during the constant speed time interval of the scanner unit. When a print-out request is sent from the LBP circuit 1007, the CPU 30 starts sheet feeding from the transfer sheet stacker (cassette) 14 or 15.

In the apparatus of this embodiment, even if the end of sheet feed preparation is completed within a sheet feed time interval 1 of the first sheet, the image data is not output to the image data line 1014 until an image data output enable signal is received at the timing ①. Upon reception of the image data output enable signal at the timing ①, the image data is output onto the image data line 1014. When sheet feed designation for the second or subsequent sheets is made, the sheet is fed at a normal copy timing, and the same control as in the first sheet is performed.

When sheet feeding for the second or subsequent sheets is made, sheet feeding is performed in the same manner as in the normal copy timing, and the same operation as in the first sheet is performed, as described above. However, when the end of sheet feed preparation is not completed before an image data output enable signal timing ①' within a sheet feed time interval 2 for the second sheet, the image data is not output onto the image data line 1014 but is output onto the image data line 1014 upon reception of the next image data output enable signal, as a matter of course.

In the copying machine in which the scanner unit and the printer unit are operated independently of each other, control is performed such that the image data is read from the scanner unit during a time interval in which the scanner unit is operated at a constant speed, and that the printer unit executes the print-out operation in synchronism with the image output enable signal output simultaneously with the start of reading in the scanner unit. Vibrations at the rise and fall times of the scanner unit do not adversely affect the print-out operation at the printer unit. Therefore, image degradations such as blurring and partial omission of the output image at the copying machine can be prevented.

<Modification>

In the above embodiment, the control means 2000 performs synchronous control as in the copying operation so as to eliminate the influences of vibrations caused by the interaction between the scanner unit and the printer unit although the scanner and printer units perform different jobs. However, the present invention is not limited to the particular embodiment described above. For example, the scanner and printer units may be controlled to be intermittently operated to obtain the same effect as in the above embodiment.

A modification for intermittent drive control between the scanner and printer units will be described below. The overall arrangement of the image forming apparatus of this modification is substantially the same as that of the above embodiment, and a detailed description thereof will be omitted.

Figure 13:
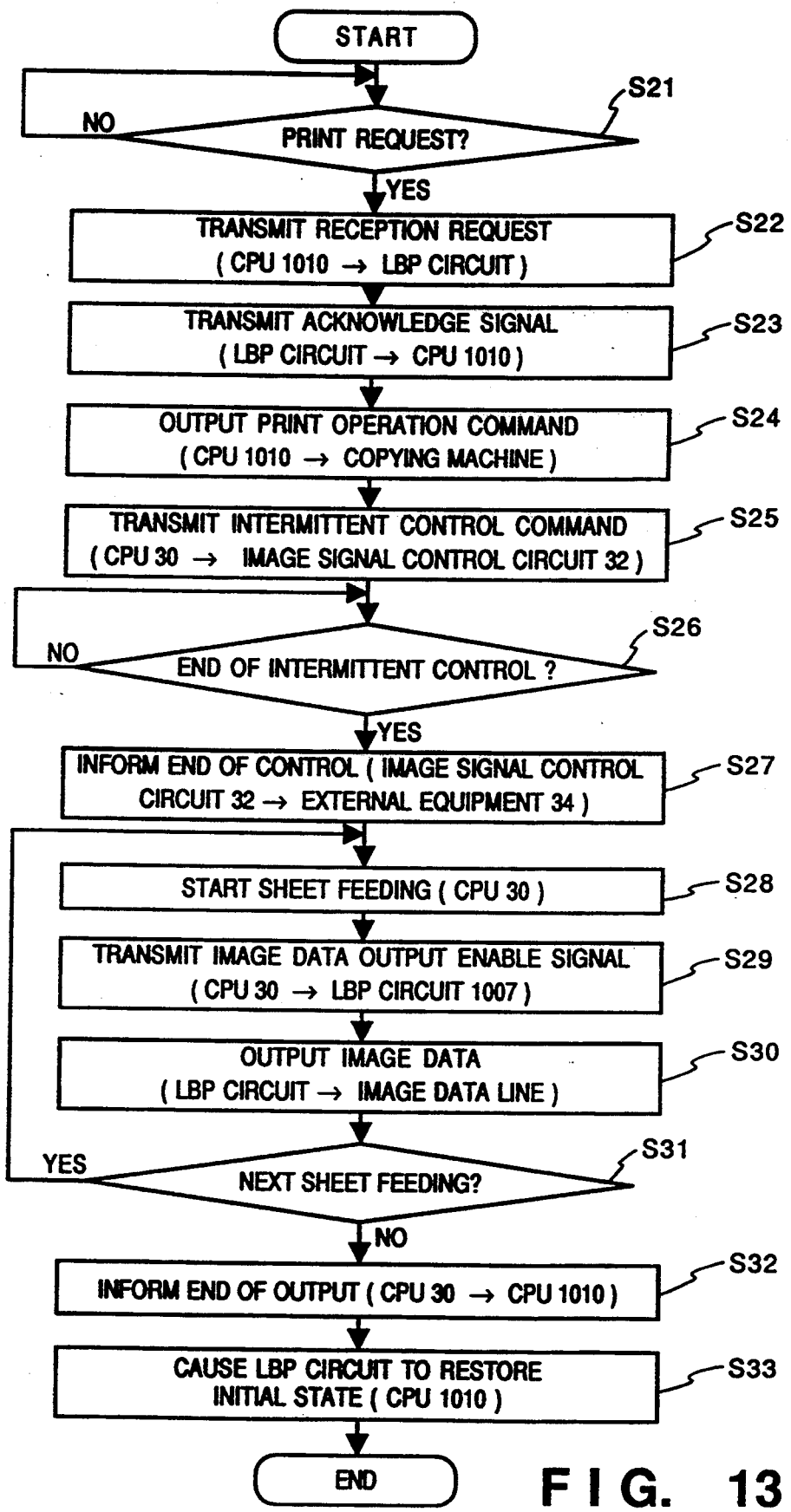
FIG. 13 is a flow chart showing a control sequence of intermittent driving of the scanner and printer units of a modification.

An operation of a control means 2000 serving as the main part of the apparatus of this modification for performing control free from the influences of vibrations of the scanner and printer units when each function independently operates the scanner and printer units will be described above. In the apparatus of this modification, the scanner and printer units are intermittently operated in different jobs. An operation for printing image data from a computer during facsimile transmission will be exemplified. This operation will be described with reference to a flow chart in FIG. 13.

In the same manner as in the above embodiment, image data is transmitted from the copying machine 1000 to the FAX circuit 1006 through the image data line 1014 (FIG. 9). In the image read mode, an image signal from the image sensor 9, i.e., an input signal from the image reader shown in FIG. 2 is processed by the image signal control circuit 32 controlled by the CPU 30, and the processed signal is supplied to the external equipment 34. In this case, if a print output request is sent from a computer (not shown) to the CPU 1010 through the external I/F circuit 1011 (i.e., YES in step S21 in FIG. 13), the CPU 1010 outputs a reception request to the LBP circuit 1007 (step S22). An acknowledge signal is supplied from the LBP circuit 1007 to the CPU 1010 through the communication line 1013 (step S23), and the CPU 1010 outputs a print operation command to the copying machine 1000 through the communication line 1013 (step S24).

Upon reception of the print operation command, the copying machine 1000, i.e., the CPU 30 outputs a control command to the image signal control circuit 32 to alternately perform the output of image data currently read by the scanner unit to the external equipment 34 and printing of the image data from the external equipment 34 (step S25). Upon reception of this control command, the image signal control circuit 32 assures a processing system which allows alternate processing. When the image signal control circuit 32 determines the end of control (step S26), it informs the end of control to the external equipment 34 through the CPU 30 (step S27). The external equipment 34 outputs data from the copying machine 1000 to the FAX circuit 1006 and at the same time outputs the data from the LBP circuit 1007 to the copying machine 1000. That is, the image signal from the external equipment 34 is processed by the image signal control circuit 32, and the processed data is input to the printer unit 33. The signal input to the printer unit 33 is converted into an optical signal by the exposure controller 10 as in the above embodiment, and the photosensitive drum 11 is scanned with light in accordance with the image signal. A latent image formed with the illumination light on the photosensitive drum is developed by the developing unit 13. In synchronism with formation of the latent image, a transfer sheet is fed from the transfer sheet stacker 14 or 15 (step S28). The developed image is transferred to the transfer sheet by the transfer unit 16. The transferred image is fixed on the transfer sheet by the fixing unit 17. The transfer sheet is then discharged outside the apparatus by the discharge unit 18.

The LBP circuit 1007 does not output the image data onto the image data line 1014 until it receives an image data output enable signal from the CPU 30, although the end of sheet feed preparation is confirmed. Upon reception of this image data output enable signal, the image data is output to the image data line 1014.

The CPU 30 determines the presence/absence of the next sheet feeding (step S31). If the next sheet is to be fed, sheet feeding is performed (YES in step S31, and the processing returns to step S28). If the next sheet feeding is not required, the CPU 30 informs the end of output to the CPU 1010 (step S32). As a result, the LBP circuit 1007 restores the initial state under the control of the CPU 1010 (step S33), thus ending the processing.

Figure 14:
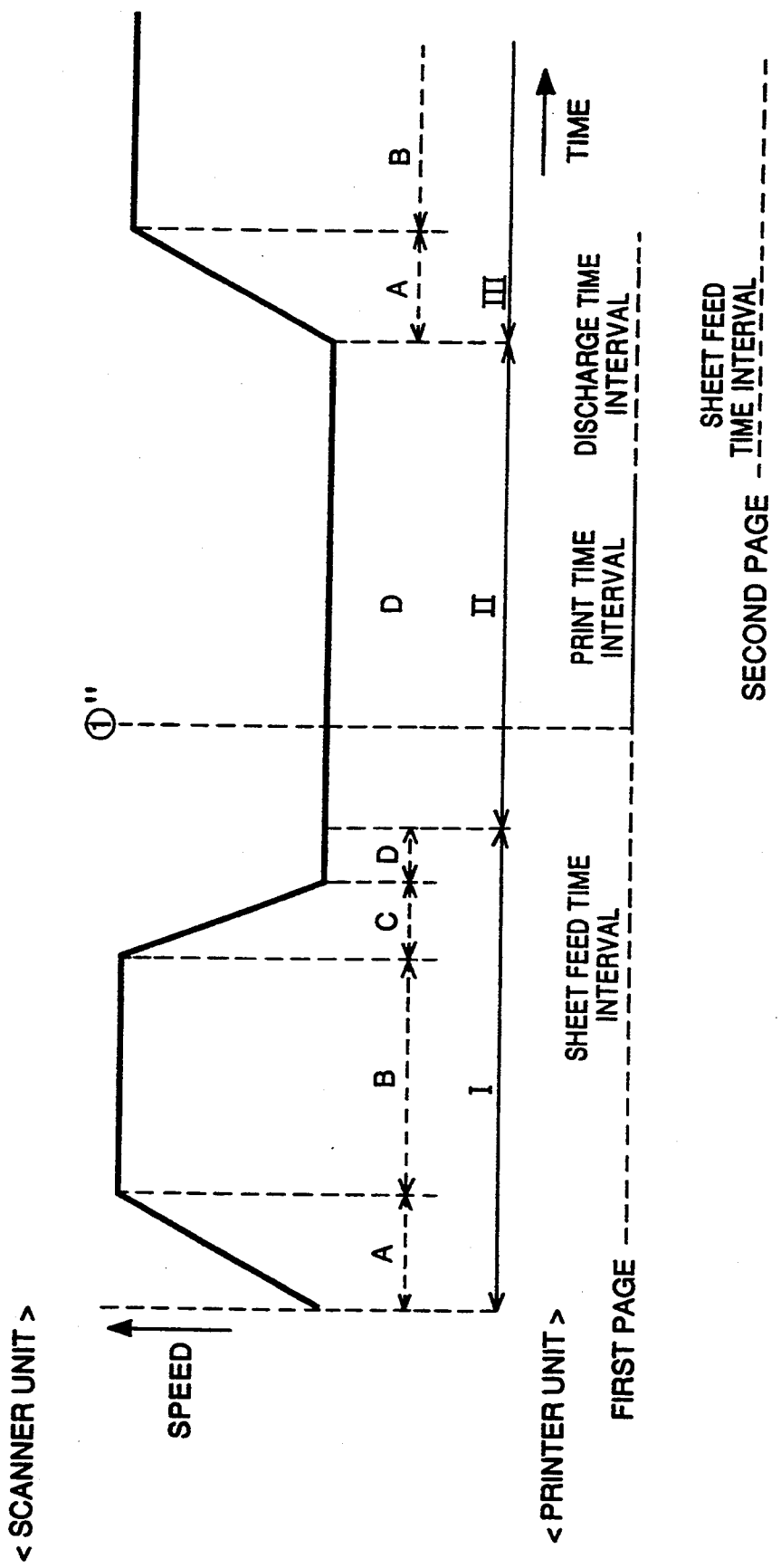
FIG. 14 is a timing chart obtained when a printing operation from a computer is performed during facsimile transmission according to the modification.

FIG. 14 shows timings for reading image data from the scanner unit and outputting the image data from the printer unit in the apparatus of this modification.

The LBP circuit 1007 receives an image data output enable signal (corresponding to step S29 in FIG. 13) at a timing ①″ of a timing signal shown in FIG. 14 and sends image data onto the image data line 1014 (step S30). At this time, the scanner unit is kept stopped, and image data from the scanner unit is not output to the image data line 1014.

In the timing chart shown in FIG. 14, a time interval A is a rise time interval of the scanner unit, a time interval B is a constant speed time interval of the scanner unit, a time interval C is a fall time interval of the scanner unit, and a time interval D is an idle time interval of the scanner unit. Image data is read from the scanner unit during the constant speed time interval of the scanner unit. When a print-out request is sent from the LBP circuit 1007, the CPU 30 controls to start sheet feeding from the transfer sheet stacker (cassette) 14 or 15. Even if the end of sheet feed preparation is completed within a sheet feed time interval of the first sheet, the image data is not output to the image data line 1014 until an image data output enable signal is received at the timing ①″. Upon reception of the image data output enable signal at the timing ①″, the image data is output onto the image data line 1014. When sheet feed designation for the second or subsequent sheets is made, the sheet is fed at a normal copy timing, and the same control as in the first sheet is performed.

When sheet feeding for the second or subsequent sheets is made, sheet feeding is performed in the same manner as in the normal copy timing, and the same operation as in the first sheet is performed, as described above. However, when the end of sheet feed preparation is not completed before an image data output enable signal timing ①″ within a sheet feed time interval for the second sheet, the image data is not output onto the image data line 1014 but is output onto the image data line 1014 upon reception of the next image data output enable signal, as a matter of course.

In this modification, since the scanner unit and the printer unit are intermittently driven, the influences of the vibrations caused by the interaction between the scanner unit and the printer unit can be prevented, and therefore image degradations of an output images can be prevented.

The present invention may be applied to a system constituted by a plurality of devices or an apparatus comprising only one device. The system or apparatus according to the present invention can be achieved by supplying a program thereto.

As has been described above, according to the present invention, while the scanner unit reads image data at a constant speed or stops reading it, a print-out operation is performed at the printer unit, thereby preventing image degradations caused by the vibrations occurring due to the interaction between the scanner unit and the printer unit.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
   reading means for reading an original image;
   recording means for recording an image; and
   control means for controlling a relative timing between a reading operation of the reading means and a recording operation of the recording means,
   wherein said apparatus is capable of performing a reading operation in a first mode in parallel with a recording operation in a second mode, where in the first mode the original image is read by said reading means and in the second mode an image independent of the original image read by said reading means in the first mode is recorded by said recording means, and
   wherein said control means controls the relative timing between the reading operation in the first mode and the recording operation in the second mode so that vibrations caused by one of the reading operation and the recording operation do not affect another one of the reading operation and the recording operation.

2. The apparatus according to claim 1, further comprising input means for inputting image data from an external device,
   wherein in the second mode said recording means performs the recording operation on the basis of the input image data.

3. The apparatus according to claim 1, further comprising sending means for sending image data corresponding to the original image read by the reading means in the first mode.

4. The apparatus according to claim 2, wherein the second mode comprises at least one of recording an image received by facsimile reception, recording an image which was stored in storage means as a file, and recording an image based upon image data which is sent from a host computer.

5. The apparatus according to claim 3, wherein said first mode comprises at least one of reading out an image to be transmitted by facsimile transmission and reading out an image so as to record the image in a storage means.

6. The apparatus according to claim 1, wherein said reading means includes an optical unit for scanning the original, and said apparatus permits an operation susceptible to vibrations in said second mode when the optical unit is at a constant speed or stops in said first mode.

7. The apparatus according to claim 1, wherein said reading means includes an optical unit for scanning the original, and said apparatus permits said recording means to perform an operation minimally perturbed by vibrations in the second mode while the optical unit is increasing or decreasing its speed in the first mode.

8. The apparatus according to claim 7, wherein the operation which is minimally perturbed by vibrations includes a discharging operation of a recording paper.

9. A controlling method for an apparatus capable of performing a first operation in parallel with a second operation, at least one of the first and the second operations causing known vibrations, comprising the steps of:

(a) discriminating whether or not a request for performing the first operation is received;

(b) determining whether or not known vibrations caused by either of the first operation and the second operation affect the other operation if the requested first operation is started in accordance with a state of the second operation; and (c) if the determination result at step (b) is positive, causing the requested first operation to wait to be performed at least until the determination result at step (b) becomes negative.

10. The method according to claim 9, wherein the first operation is a reading operation in a first mode, in which an original image is read but not recorded, and wherein the second operation is a recording operation in a second mode, in which an image is recorded without a reading operation.

11. The method according to claim 10, wherein the first mode comprises at least one of reading out an image to be transmitted by a facsimile transmission and reading out an image so as to record the image on a recording medium, and wherein the second mode comprises at least one of recording an image received by a facsimile reception, recording an image which was read from a recording medium, and recording an image based upon image data which is sent from a host computer.

12. The method according to claim 10, wherein at step (b), wherein the known vibrations are vibrations caused when an optical unit for scanning an original in the first mode is increasing or decreasing its moving speed in regard to whether they affect the recording operation in the second mode.

13. An image forming apparatus comprising:
reading means for reading an original image;
recording means for recording an image; and
control means for controlling a relative timing between a reading operation of the reading means and a recording operation of the recording means,
wherein said apparatus is capable of performing a reading operation in a first mode in parallel with a recording operation in a second mode, where in the first mode the original image is read by said reading means and in the second mode an image independent of the original image read by said reading means in the first mode is recorded by said recording means,
wherein said recording means comprises means for supplying a recording medium, means for forming an image on the recording medium and means for discharging the recording medium on which the image is formed, and said recording operation in the second mode includes a paper-supplying operation, an image-forming operation and a paper-discharging operation, and
wherein said control means controls a relative timing between the reading operation in the first mode and the recording operation in the second mode so that the reading operation in the first mode and at least one of the paper-supplying operation and the paper-discharging operation are to be performed simultaneously, and the reading operation in the first mode and the image-forming operation are prevented from being performed simultaneously.

14. The apparatus according to claim 13, further comprising input means for inputting image data from an external device,
wherein in the second mode said recording means performs the recording operation on the basis of the input image data.

15. The apparatus according to claim 13, wherein in a case where a reading operation for reading plural pages in the first mode and a recording operation for recording plural pages in the second mode are performed simultaneously, the paper-supplying operation and/or the paper-discharging operation are simultaneously performed while the reading operation is being performed for each of the plural pages, and the image forming operation for forming one page is performed in an interval corresponding to reading two pages image by the reading operation.

16. The apparatus according to claim 13, wherein the second mode comprises at least one of recording an image received by facsimile reception, recording an image which was read from a storage medium, and recording an image based upon image data which is sent from a host computer.

17. The apparatus according to claim 13, wherein the first mode comprises at least one of reading out an image to be transmitted by facsimile transmission and reading out an image so as to record the image in a storage means.

18. The apparatus according to claim 13, wherein said reading means includes an optical unit for scanning the original image, and said apparatus permits an operation susceptible to vibrations in said second mode when the optical unit is not scanning in said first mode.

19. The apparatus according to claim 13, further comprising sending means for sending image data corresponding to the original image by the reading means in the first mode.

20. The apparatus according to claim 19, further comprising receiving means for receiving image data corresponding to an image to be recorded in the second mode.

21. The apparatus according to claim 20, wherein the image data sent by said sending means and the image data received by said receiving means are transmitted through a common line.

* * * * *

UNITED STATES PATENT AND TRADEMARK OFFICE
CERTIFICATE OF CORRECTION

PATENT NO. : 5,402,208
DATED : March 28, 1995
INVENTOR(S) : HIROSHI OHMURA, ET AL.

It is certified that error appears in the above-identified patent and that said Letters Patent is hereby corrected as shown below:

<u>IN THE DRAWINGS</u>

Sheet 6 of 12, FIG. 8: "DPRESS" should read --DEPRESS--.

<u>COLUMN 3</u>

Line 35, "of on" should read --of--.

<u>COLUMN 13</u>

Line 35, "speed" should read --speed, determining--.

Signed and Sealed this

Eighteenth Day of July, 1995

Attest:

BRUCE LEHMAN

*Attesting Officer*  *Commissioner of Patents and Trademarks*